(12) United States Patent
Onomatsu (10) Patent No.: US 8,130,326 B2
(45) Date of Patent: Mar. 6, 2012

(54) TELEVISION BROADCAST SIGNAL RECEIVING SYSTEM, TELEVISION BROADCAST SIGNAL RECEIVING APPARATUS, AND ANTENNA APPARATUS

(75) Inventor: Takehiro Onomatsu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1330 days.

(21) Appl. No.: 11/730,700

(22) Filed: Apr. 3, 2007

(65) Prior Publication Data

US 2008/0012781 A1 Jan. 17, 2008

(30) Foreign Application Priority Data

Apr. 5, 2006 (JP) ................................. 2006-103944

(51) Int. Cl.
*H04N 5/44* (2011.01)
(52) U.S. Cl. ..... 348/725; 348/731; 348/705; 455/277.1; 343/876
(58) Field of Classification Search .................. 348/725, 348/731, 732, 726, 705, 707; 343/725, 876; 725/100, 72; 455/277.1
See application file for complete search history.

(56) References Cited

U.S. PATENT DOCUMENTS

| | | | | |
|---|---|---|---|---|
| 4,430,669 A | * | 2/1984 | Cheung | 380/241 |
| 6,652,634 B1 | * | 11/2003 | Akers et al. | 106/31.13 |
| 7,136,113 B2 | * | 11/2006 | Lee | 348/725 |
| 7,570,224 B2 | * | 8/2009 | Onomatsu et al. | 343/876 |
| 7,610,010 B2 | * | 10/2009 | Onomatsu et al. | 455/3.01 |
| 7,652,634 B2 | * | 1/2010 | Finn et al. | 343/850 |
| 7,738,046 B2 | * | 6/2010 | Keate et al. | 348/725 |
| 7,805,743 B2 | * | 9/2010 | Onomatsu et al. | 725/72 |
| 2006/0125708 A1 | * | 6/2006 | Narita | 343/818 |

FOREIGN PATENT DOCUMENTS

| | | |
|---|---|---|
| JP | 6-113220 A | 4/1994 |
| JP | 7-15366 A | 1/1995 |
| JP | 2001-36327 A | 2/2001 |
| JP | 2001-68627 A | 3/2001 |
| JP | 2005-117608 A | 4/2005 |
| JP | 2006-60676 A | 3/2006 |

OTHER PUBLICATIONS

Japanese Office Action dated Dec. 6, 2012 (four (4) pages).

* cited by examiner

*Primary Examiner* — Michael Lee
(74) *Attorney, Agent, or Firm* — Crowell & Moring LLP (57) ABSTRACT

A television broadcast signal receiving system including an antenna apparatus including a first antenna which can receive a broadcast signal in a first frequency band and a second antenna which can receive a broadcast signal in a second frequency band and a television broadcast signal receiving apparatus including a selection unit for selecting the first antenna or the second antenna according to a frequency of a broadcast signal which is to be received, a detecting unit for detecting a receiving level of a received signal which is received by the first antenna or the second antenna, a channel setting unit for setting a channel of the broadcast signal in which the receiving level detected by the detecting unit is not less than a predetermined value as a receivable channel, and a control unit for controlling each operation of the selection unit, the detecting unit, and the channel setting unit.

15 Claims, 6 Drawing Sheets

| ANTENNA TYPE | | | RECEIVE CHANNEL NUMBER INFORMATION | |
|---|---|---|---|---|
| RESERVATION CODE | MANUFACTURE'S NAME | MODEL NUMBER | FIRST ANTENNA RECEIVABLE CHANNEL | SECOND ANTENNA RECEIVABLE CHANNEL |
| a | aaaa | AA | 18~69 | 1~17 |
| b | bbbb | BB | 21~69 | 1~20 |
| c | cccc | CC | 15~69 | 1~14 |
| ... | ... | ... | ... | ... |

TELEVISION BROADCAST SIGNAL RECEIVING SYSTEM, TELEVISION BROADCAST SIGNAL RECEIVING APPARATUS, AND ANTENNA APPARATUS

BACKGROUND OF THE INVENTION

1. Field of the Invention

The present invention relates to a television broadcast signal receiving system which can receive television broadcast signals in the UHF band and the VHF band, and more particularly, to a television broadcast signal receiving apparatus having a channel auto scanning (channel auto setting) function using a multiple directional antenna and an antenna apparatus suitable to the television broadcast signal receiving apparatus.

2. Description of the Related Art

In North America where the ATSC digital television broadcast (hereinafter, abbreviated as TV broadcast) is carried out, TV broadcast signals are transmitted from various directions because large cities are scattered across the plain area and a number of broadcasting station exist. In such environment, viewers who receive the TV broadcast signals need to adjust the receiving direction of the antenna in the direction of a broadcasting station in which the program they want to watch is broadcasted. Consequently, multiple directional antennas such as a smart antenna and the like are in practical use (for example, see Tokukai 2005-117608 and Tokukai 2001-036327 (Tokkyo 3625155)).

Moreover, a technique relating to an auto scanning function which can automatically set the receiving direction of the antenna in which the TV broadcast signal of the channel selected by a viewer can be received in the best condition is proposed (for example, see Tokukaihei 06-113220 and Tokukai 2001-68627). Normally, antennas of broadcasting stations, i.e. positions of broadcasting towers do not vary. Therefore, scanning is carried out in a plurality of directions (for example, 16 directions) for each channel to set the direction having the best receiving condition as the receiving direction of the channel.

According to the EIA-909 standard, it is defined that the smart antenna has receiving directions in each of 16 directions into which a circle is divided. Meanwhile, a digital TV broadcast signal receiving apparatus which complies with the EIA-909 standard is constructed so as to control the receiving directions with respect to all 16 directions in which the signal can be received by the smart antenna.

By the way, in a television broadcast signal receiving apparatus, a channel auto scanning needs to be carried out in order to receive broadcast signals from each broadcasting station, and the viewers prefer to complete the channel auto scanning as quickly as possible. However, when auto scanning of channels is executed by using the smart antenna and the auto scanning function which are disclosed in the above mentioned prior art, there is a problem that it takes a long time to carry out the setting because the scanning is carried out in all 16 directions for each channel whether the TV broadcast signal is in the VHF band or the UHF band.

On the other hand, in recent years, digitalization of terrestrial broadcasting is rapidly progressing throughout the world. The terrestrial digital broadcasting is broadcasted in tandem with the existing UHF analog broadcasting. However, at each allotted channel frequency, 5 or 6 programs can be transmitted simultaneously. Therefore, there is an advantage where the problem of restricted frequency can be eliminated by using vacant-frequencies in various areas. Moreover, it is decided that the terrestrial analog broadcasting is to be terminated and shifts to the terrestrial digital broadcasting completely in few years. Consequently, broadcasting using the VHF band is to be reduced and terminated in the future.

Under such situation, the number of channels which are not received (vacant-channel) increases. Therefore, more needless time may be spent even when the above mentioned prior art is used to set a channel in the VHF band.

In an antenna apparatus in which a multiple directional antenna for the UHF band and a unidirectional antenna for the VHF band are provided, which antenna is used and how wide the frequency band which can be covered by the antenna are different according to the specification of an antenna element. Therefore, when carrying out the channel auto scanning process in the television broadcast signal receiving apparatus, the best suitable frequency range (range of channels which can be received) is not necessarily always set for each antenna.

SUMMARY OF THE INVENTION

An object of the present invention is to provide a television broadcast signal receiving system in which information relating to an antenna apparatus which is needed for a channel auto scanning processing in a television broadcast signal receiving apparatus (for example, a frequency band which can be received by an antenna element) can be set easily by using a bidirectional communication defined in, for example, the EIA/CEA-909 standard.

In accordance with the first aspect of the present invention, a television broadcast signal receiving system comprises an antenna apparatus comprising a first antenna which can receive a broadcast signal in a first frequency band and a second antenna which can receive a broadcast signal in a second frequency band and a television broadcast signal receiving apparatus comprising a selection unit for selecting the first antenna or the second antenna according to a frequency of a broadcast signal which is to be received, a detecting unit for detecting a receiving level of a received signal which is received by the first antenna or the second antenna, a channel setting unit for setting a channel of the broadcast signal in which the receiving level detected by the detecting unit is not less than a predetermined value as a receivable channel, and a control unit for controlling each operation of the selection unit, the detecting unit, and the channel setting unit, and the antenna apparatus comprises a transmission unit which can transmit identification information of the antenna apparatus to the television broadcast signal receiving apparatus, the television broadcast signal receiving apparatus comprises a receiving unit which can receive information relating to the antenna apparatus which is transmitted from the antenna apparatus and a frequency range setting unit which can set ranges of the first frequency band which is to be received by the first antenna and the second frequency band which is to be received by the second antenna based on the information relating to the antenna apparatus which is received by the receiving unit, and the control unit controls the selection unit based on the first frequency band and the second frequency band which are set by the frequency range setting unit.

That is, the frequency band of the broadcast signal (physical channel) which is to be received by the first antenna and the second antenna of the antenna apparatus can be set easily in the television broadcast receiving apparatus.

Preferably, the identification information of the antenna apparatus is included in the information relating to the antenna apparatus, the television broadcast signal receiving apparatus comprises a storage unit in which the identification information by which the antenna apparatus can be identified and receive channel number information corresponding to the identification information are stored, and the frequency range setting unit sets the ranges of the first frequency band which is to be received by the first antenna and the second frequency band which is to be received by the second antenna by reading out the corresponding receive channel number information from the storage unit based on the identification information of the antenna apparatus which is transmitted from the antenna apparatus.

For example, by storing the identification information of the antenna apparatus in the reservation code which is defined by the communication mode B of the EIA/CEA-909, a type of the antenna apparatus can be specified in the television broadcast signal receiving apparatus based on the reservation code. Further, the first frequency band which is to be received by the first antenna and the second frequency band which is to be received by the second antenna can be set easily.

Preferably, receive channel number information is included in the information relating to the antenna apparatus, and the frequency range setting unit sets the ranges of the first frequency band which is to be received by the first antenna and the second frequency band which is to be received by the second antenna based on the receive channel number information which is transmitted from the antenna apparatus. In this case, there is no need to store the table in which the antenna type and the receive channel number information correspond to each other in the memory of the television broadcast signal receiving apparatus.

Further, preferably, the receiving unit automatically starts a process of obtaining the information relating to the antenna apparatus when the television broadcast signal receiving apparatus is connected to the antenna apparatus.

According to the present invention, a television broadcast signal receiving system comprises an antenna apparatus comprising a first antenna which can receive a broadcast signal in a first frequency band and a second antenna which can receive a broadcast signal in a second frequency band, and a television broadcast signal receiving apparatus comprising a selection unit for selecting the first antenna or the second antenna according to a frequency of a broadcast signal which is to be received, a detecting unit for detecting a receiving level of a received signal which is received by the first antenna or the second antenna, a channel setting unit for setting a channel of the broadcast signal in which the receiving level detected by the detecting unit is not less than a predetermined value as a receivable channel, and a control unit for controlling each operation of the selection unit, the detecting unit, and the channel setting unit, and the antenna apparatus comprises a transmission unit which can transmit identification information of the antenna apparatus to the television broadcast signal receiving apparatus, the television broadcast signal receiving apparatus comprises a receiving unit which can receive information relating to the antenna apparatus which is transmitted from the antenna apparatus and a frequency range setting unit which can set ranges of the first frequency band which is to be received by the first antenna and the second frequency band which is to be received by the second antenna based on the information relating to the antenna apparatus which is received by the receiving unit, and the control unit controls the selection unit based on the first frequency band and the second frequency band which are set by the frequency range setting unit. Therefore, a viewer can easily set the information relating to the antenna apparatus (for example, the frequency band which can be received by the antenna element) which is needed for the channel auto scanning process in the television broadcast signal receiving apparatus without carrying out complicated settings.

Thus, the best suitable channel auto scanning process can be carried out in the antenna apparatus which is connected to the television broadcast signal receiving apparatus.

In accordance with the second aspect of the present invention, a television broadcast signal receiving apparatus which is connected to an antenna apparatus having a first antenna which can receive a broadcast signal in a first frequency band and a second antenna which can receive a broadcast signal in a second frequency band comprises a selection unit for selecting the first antenna or the second antenna according to a frequency of a broadcast signal which is to be received, a detecting unit for detecting a receiving level of a received signal which is received by the first antenna or the second antenna, a channel setting unit for setting a channel of the broadcast signal in which the receiving level detected by the detecting unit is not less than a predetermined value as a receivable channel, a control unit for controlling each operation of the selection unit, the detecting unit, and the channel setting unit, a receiving unit which can receive information relating to the antenna apparatus which is transmitted from the antenna apparatus, and a frequency range setting unit which can set ranges of the first frequency band which is to be received by the first antenna and the second frequency band which is to be received by the second antenna based on the information relating to the antenna apparatus which is received by the receiving unit, and the control unit controls the selection unit based on the first frequency band and the second frequency band which are set by the frequency range setting unit.

In accordance with the third aspect of the present invention, an antenna apparatus connected to a television broadcast signal receiving apparatus comprises a multiple directional antenna which can receive a broadcast signal in a first frequency band from multiple directions, an unidirectional antenna which can receive a broadcast signal in a second frequency band from one direction, a first switching unit which can control a selection of an antenna which receives the broadcast signal by the television broadcast signal receiving apparatus, a second switching unit which can control a switching of a receiving direction of the multiple directional antenna, and a transmitting unit which can transmit information relating to the antenna apparatus to the television broadcast signal receiving apparatus.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein.

PREFERRED EMBODIMENT OF THE INVENTION

Hereinafter, a preferred embodiment of the present invention is described with reference to the drawings. However, the drawings are in no way to limit the scope of the invention.

Figure 1:
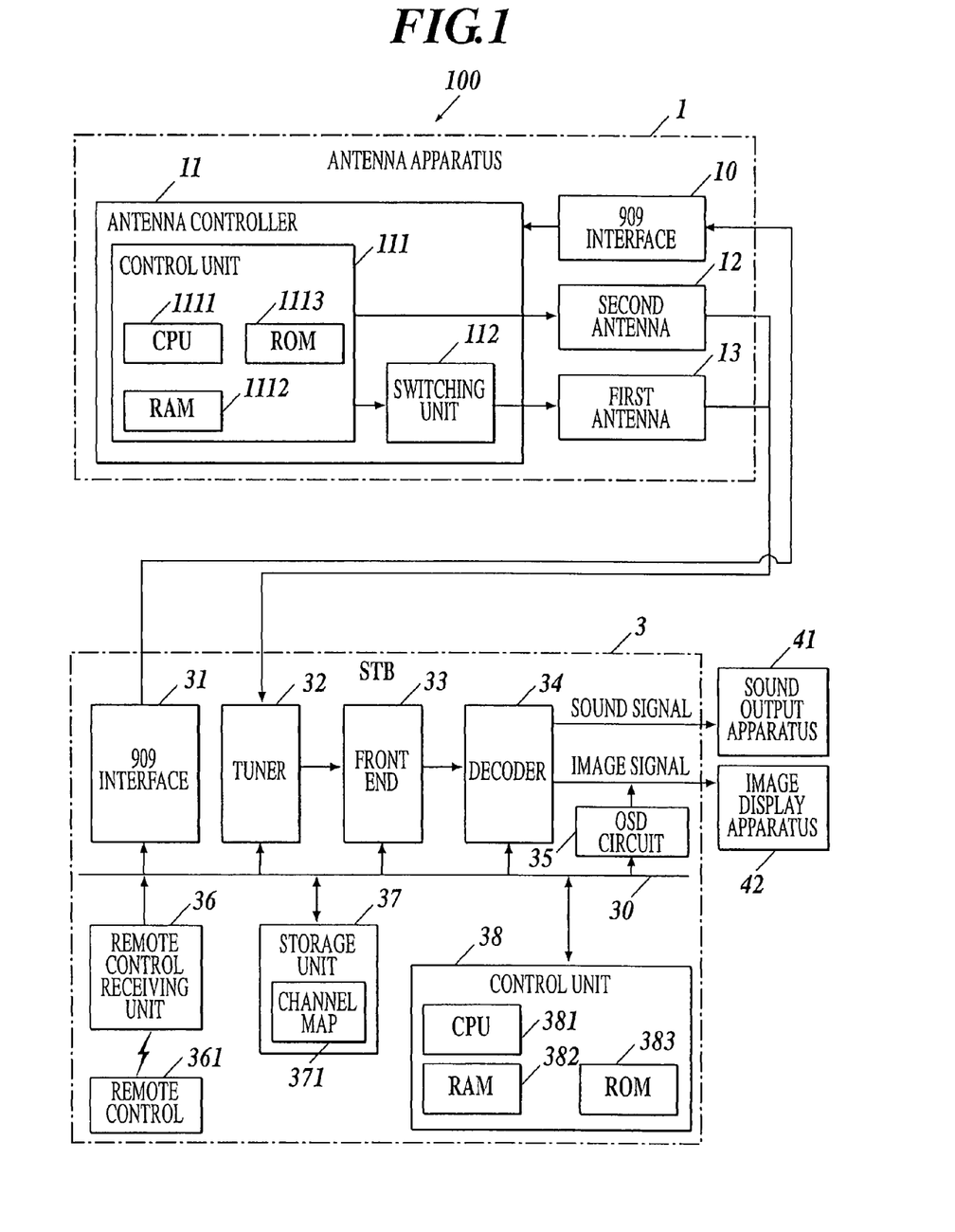
FIG. 1 is a block diagram showing a functional structure of a television broadcast signal receiving system according to the embodiment.
Figure 2:
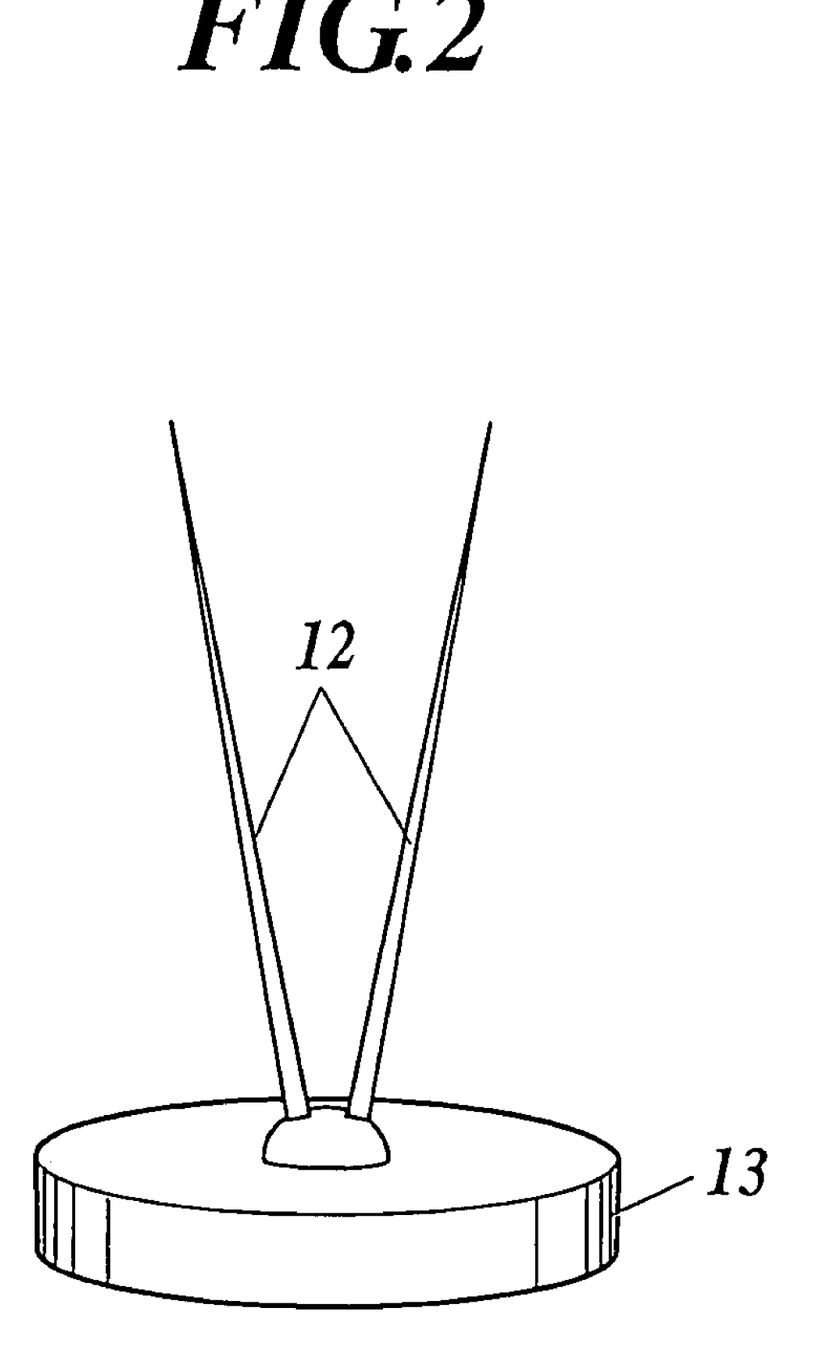
FIG. 2 is a perspective view showing an outer appearance of an antennal apparatus 1 according to the embodiment.

FIG. 1 is a block diagram showing a functional structure of a television broadcast signal receiving system and FIG. 2 is a perspective view showing an outer appearance of an antenna apparatus 1.

The television broadcast signal receiving system 100 according to the embodiment comprises an antenna apparatus 1 which can receive broadcast signals from a plurality of directions and a Set Top Box (hereinafter, abbreviated as STB) 3 as a television broadcast signal receiving apparatus to which the antenna apparatus 1 is connected.

The antenna apparatus 1, for example, is controlled by the STB3 based on a predetermined standard (for example, the EIA/CEA-909 or the like), and is constructed so that the information relating to the antennal apparatus 1 (identification information and the like) can be transmitted to the STB 3.

The STB 3, for example, sets a frequency range of the television broadcast signal (hereinafter, called "TV broadcast signal") which is to be received by the antenna apparatus 1 based on the information relating to the antenna apparatus, which is transmitted from the antenna apparatus 1, and receives the television broadcast signal through the antenna apparatus 1. Further, the STB 3 outputs a sound or an image based on the received TV broadcast signal.

In the embodiment, the antenna apparatus 1 and the STB 3 comply with the EIA/CEA-909 standard (communication mode A, B) as an example, and the interface for carrying out a bidirectional communication between the antenna apparatus 1 and the STB 3 is called the 909 interface.

The antenna apparatus 1 comprises, for example, a 909 interface 10, an antenna controller 11, a first antenna (multiple directional antenna) 13 which can switch the directivity when receiving a TV broadcast signal (for example, the UHF signal) in a first frequency band, and a second antenna (unidirectional antenna) 12 in which the directivity is fixed when receiving a TV broadcast signal (for example, the VHF signal) in a second frequency band. For example, the first antenna 13 and the second antenna 12 are detachably linked as shown in FIG. 2.

The second antenna 12 is, for example, an antenna which is constructed so as to receive TV broadcast signals in the second frequency band which are transmitted from a broadcasting tower or the like of a broadcasting station. Particularly, the second antenna 12 is a so-called rabbit antenna, and is detachably mounted on the first antenna 13.

The first antenna 13 is, for example, an antenna which is constructed so as to receive TV broadcast signals in the first frequency band which are transmitted from a broadcasting tower or the like of a broadcasting station. Particularly, the first antenna 13 is a so-called smart antenna (Yagi antenna), and the directivity can be adjusted in a plurality of directions (for example, 16 directions).

The first antenna 13 and the second antenna 12 are connected to a tuner 32 in the STB 3. The first antenna 13 and the second antenna 12 carry out a gain control process such as amplifying the TV broadcast signal in a predetermined gain when a TV broadcast signal is received, and output the TV broadcast signal (particularly, RF (Radio Frequency) signal) to the tuner 32.

Here, the first frequency band which is to be received by the first antenna 13 and the second frequency band which is to be received by the second antenna 12 are set in the STB 3 based on the information relating to the antenna apparatus which is transmitted from the antenna apparatus 1.

The 909 interface 10, for example, is connected to a 909 interface 31 (after-mentioned) in the STB 3. The 909 interface 10 carries out a communication with the 909 interface 31 (after-mentioned) in the STB 3 based on a predetermined standard (for example, the EIA/CEA-909 or the like), and receives channel information (after-mentioned) and the like from the STB 3 to control the antenna apparatus 1 and transmits the information relating to the antenna apparatus for setting a frequency range which is to be received by the first antenna 13 or the second antenna 12 to the STB 3.

The antenna controller 11 comprises, for example, a control unit 111 and a switching unit 112. The control unit 111 further comprises, for example, a CPU (Central Processing Unit) 1111, a RAM (Random Access Memory) 1112, and a ROM (Read Only Memory) 1113.

The CPU 1111 controls various types of operations according to various types of processing programs for the antenna controller 11 which are stored in the ROM 1113. The RAM 1112 comprises a program storage area to expand the processing programs and the like which are executed by the CPU 1111 and a data storage area to store input data and processing results which are caused when the above mentioned processing programs are executed. The ROM 1113 stores a system program which can be executed in the antenna controller 11, various types of processing programs which can be executed in the system program, data which is used when the various types of processing programs are executed, and data of processing results which are arithmetically processed by the CPU 1111. Here, programs are stored in the ROM 1113 in a form of program codes which can be read by a computer. For example, an acquisition program, a determination program, a selection program, and the like are stored in the ROM 1113.

The CPU 1111, for example, can acquire channel information which is transmitted from the 909 interface 31 in the STB 3 by executing the acquisition program which is stored in the ROM 1113. Here, channel information is, for example, the information corresponding to the channel (virtual channel) which is tuned by a user. Particularly, the channel information includes the physical channel number, the direction information relating to the direction of directivity of an antenna, and the gain information relating to the gain of an antenna.

Moreover, the CPU 1111 determines whether the TV broadcast signal which corresponds to the channel tuned by a user is attributed in the first frequency band or in the second frequency band by executing the determination program. Particularly, the CPU 1111 determines that the TV broadcast signal is attributed in the second frequency band when the physical channel number α is smaller or equal to a predetermined value (for example, α=17), and determines that the TV broadcast signal is attributed in the first frequency band when the physical channel number α is larger than the predetermined value. Here, the physical channel number, for example, is given so as to correspond to a frequency value in the frequency band in which the TV broadcast signal exists. The larger the physical channel number of the TV broadcast signal is, the physical channel number exists in the frequency band having large frequency values. Moreover, the UHF signal exists in the frequency band having large frequency values comparing to the VHF signal. Accordingly, whether the TV broadcast signal is attributed in the first frequency band or in the second frequency band can be determined by the physical channel number.

Moreover, by executing the selection program, the CPU 1111 selects either the second antenna 12 or the first antenna 13 according to the frequency band (physical channel number) in which the TV broadcast signal corresponding to the selected channel is attributed, and allows either of the antennas to receive the TV broadcast signal. That is, the second antenna 12 is selected so as to receive the TV broadcast signal when a channel which is attributed in the second frequency band is selected by a user, and the first antenna 13 is selected so as to receive the TV broadcast signal when a channel which is attributed in the first frequency band is selected.

For example, in compliance with a control signal which is input from the control unit 111, the switching unit 112 switches the directivity of the first antenna 13 based on the direction information when the first antenna 13 is selected as the receiving antenna.

The STB 3 comprises, for example, the 909 interface 31, the tuner 32, a front end 33, a decoder 34, an OSD circuit 35, a remote control receiving unit 36, a storage unit 37, and a control unit 38. Each unit is connected with a bus 30.

The STB 3 further comprises, for example, a remote controller (hereinafter, referred to as remote) 361 for the STB 3 which can communicate with the remote control receiving unit 36.

The 909 interface 31 is, for example, connected to the 909 interface 10 of the antenna apparatus 1, and carries out a communication with the 909 interface 10 of the antenna apparatus 1 based on a predetermined standard (for example, the EIA/CEA-909 or the like) and transmits the channel information and the like to the antenna apparatus 1 in compliance with a control signal which is input from the control unit 38.

The tuner 32 is connected to the second antenna 12 and the first antenna 13 of the antenna apparatus 1. For example, in compliance with a control signal which is input from the control unit 38, the turner 32 obtains-the TV broadcast signal which corresponds to one channel (the channel selected by a user) among TV broadcast signals which are output from the second antenna 12 or the first antenna 13, and outputs the TV broadcast signal to the front end 33.

In compliance with a control signal which is input from the control unit 38, the front end 33, for example, converts the TV broadcast signal which is output from the tuner 32 to an intermediate frequency signal, and outputs the intermediate frequency signal to the decoder 34.

In compliance with a control signal which is input from the control unit 38, the decoder 34, for example, divides the TV broadcast signal into a sound signal and an image signal and decodes them by performing the process according to a predetermined file format (for example, the MPEG-2 (Moving Picture Experts Group phase 2) format or the like) with respect to the TV broadcast signal which is output from the front end 33. Then, the decoder 34 outputs the decoded sound signal to a sound output apparatus 41, and outputs the image signal to an image display apparatus 42.

In compliance with a control signal which is input from the control unit 38, the OSD circuit 35, for example, synthesizes an OSD display signal for allowing the image display apparatus 42 to perform a predetermined OSD display (on screen display) with the image signal which is output from the decoder 34 to the image display apparatus 42.

The sound output apparatus 41, for example, is speaker equipment or the like connected to the STB 3, and outputs sounds according to the sound data based on the sound signal which is output from the decoder 34. The image display apparatus 42, for example, is liquid crystal display equipment or the like connected to the STB 3. The image display apparatus 42 displays images according to the image data based on the image signal which is output from the decoder 34 and an image according to the image data based on the image signal which is output from the decoder 34 and with which the OSD display signal (after-mentioned) is synthesized by the OSD circuit 37.

The remote control receiving unit 36, for example, receives various types of signals which are transmitted from the remote control 361, and outputs the various types of data based on the various types of signals to the control unit 38. The remote control 361, for example, has a channel key, a channel up/down key, or the like which is operated when assigning the channel to be tuned, and transmits a signal according to the key operation by a user to the remote control receiving unit 36.

The storage unit 37 comprises, for example, a magnetic storage medium, an optical storage medium, or a semiconductor memory, and a channel map 371 and the like are stored in the storage unit 37.

In the channel map 371, for example, the channel information and the like are stored. Particularly, a virtual channel number which is allotted to the channel key and the channel up/down key of the remote control 381, a physical channel number, the direction information relating to the direction of directivity of an antenna, the gain information relating to the gain of an antenna, and the like are stored so as to correspond with one another. The information which is to be stored in the channel map 391, for example, is determined in the initial setting process of the antenna system 100 and is to be stored in the channel map 391.

The control unit 38 comprises, for example, a CPU 381, a RAM 382, and a ROM 383. The CPU 381 carries out various types of controlling operations in compliance with various types of processing programs for the STB 3 which are stored in the ROM 383. The RAM 382 comprises a program storage area to expand processing programs and the like which are executed by the CPU 381 and a data storage area to store input data and processing results which are caused when the above mention processing programs are executed. The ROM 383 stores a system program which can be executed in the STB 3, various types of processing programs which can be executed in the system program, data to be used when executing the various types of processing programs, various types of result data which are arithmetically processed by the CPU 381, and the like. Here, the programs are stored in the ROM 383 in a form of program codes which can be read by a computer. For example, the ROM 383 stores a transmission program and the like which realize a function of transmitting the channel information to the antenna apparatus 1 through the 909 interface 31.

For example, when a channel is tuned by a key operation or the like of the remote control 361 by a user, the CPU 381 obtains the channel information (physical channel number, direction information, gain information, and the like) which corresponds to the channel number (virtual channel number) of the channel from the channel map 391 in the storage unit 39 by executing the transmission program, and transmits the channel information to the antenna apparatus 1 through the 909 interface 31.

Further, the control unit 38 executes the following processes: processing as the selection unit which controls the antenna apparatus 1 so as to select either the first antenna (multiple directional antenna) 13 or the second antenna (unidirectional antenna) 12 according to the frequency of the TV broadcast signal to be received; processing as the detection unit which detects the receiving level of the TV broadcast signal which is received by the first antenna 13 or the second antenna 12; and processing as a channel setting unit which sets a channel of the TV broadcast signal in which the receiving level detected by the detection unit is above or equal to a predetermined value as the receivable channel.

Moreover, the control unit 38 (frequency band setting unit) sets ranges of the first frequency band (the UHF band) which is received by the first antenna 13 and the second frequency band (the VHF band) which is received by the second antenna 12 based on the information relating to the antenna apparatus 1 which is received by the 909 interface 31 as the communication unit.

Particularly, identification information (reservation code) by which a type of an antenna can be identified and a table (see FIG. 3) in which the receive channel number information corresponding to the identification information is stored are used. Here, the reservation code is one of communication information which is defined in the communication mode B of the EIA/CEA-909, and in the embodiment, the reservation code is used as the identification information of the antenna apparatus 1. In the table shown in FIG. 3, ranges of the physical channel which can be received by the first antenna and the second antenna express the receive channel number information. Further, manufacturer's names and model numbers are stored so as to correspond to the identification information of the antenna apparatus 1.

Figure 3:
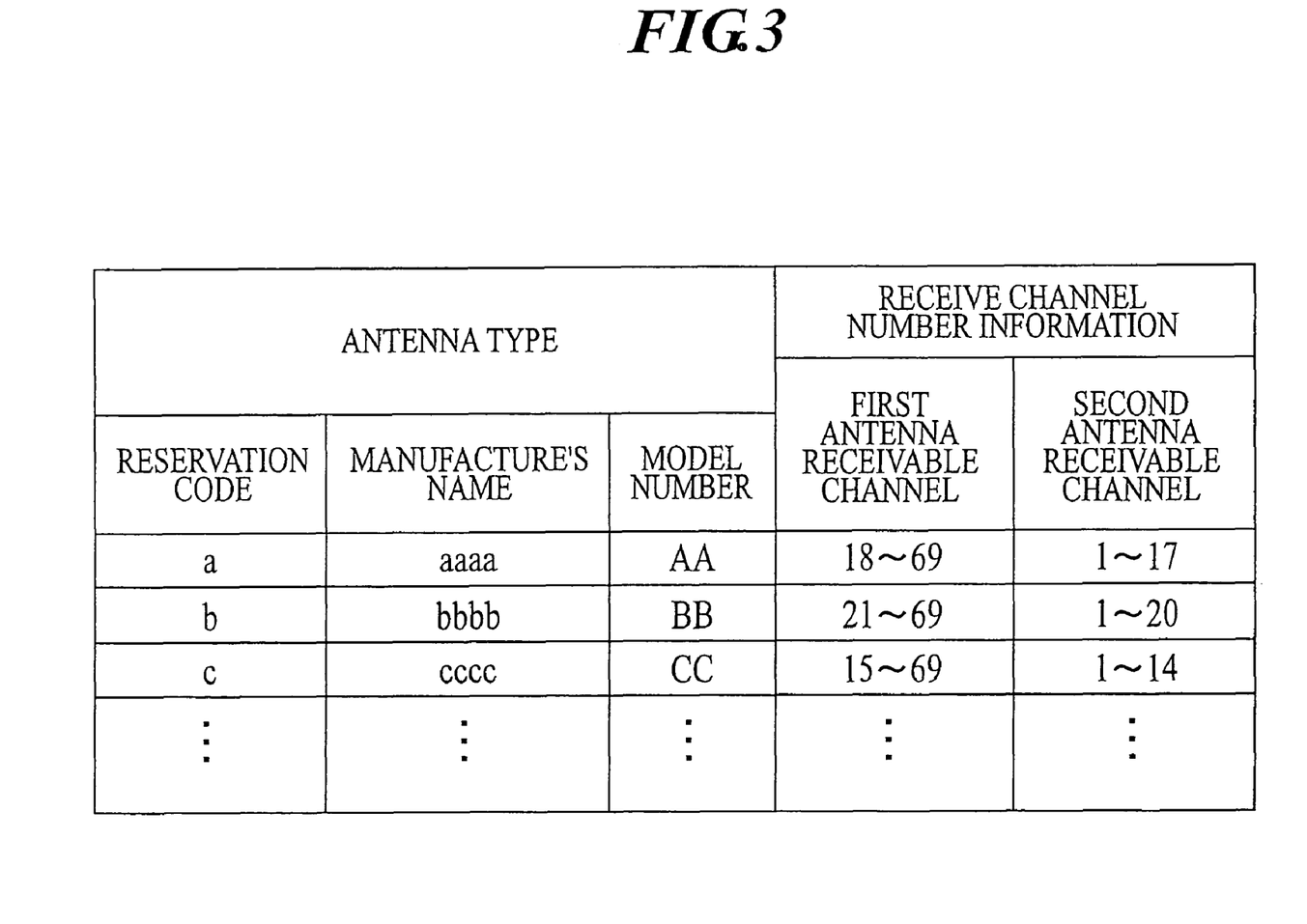
FIG. 3 is an example of a table in which antenna types and receive frequency information are stored so as to correspond with each other.

That is, the control unit 38 reads out the receive channel number information corresponding to the table shown in FIG. 3 based on the identification information (reservation code) transmitted from the antenna apparatus 1 by which the antenna apparatus 1 can be identified, and sets the physical channel receivable by the first antenna 13 (the first frequency band) and the physical channel receivable by the second antenna 12 (the second frequency band). Here, the STB 3 may be made so as to automatically start the process of obtaining the information relating to the antenna apparatus 1 when connected to the antenna apparatus 1.

As described above, the television broadcast signal receiving system 100 according to the embodiment comprises the antenna apparatus 1 and the STB 3.

Figure 4:
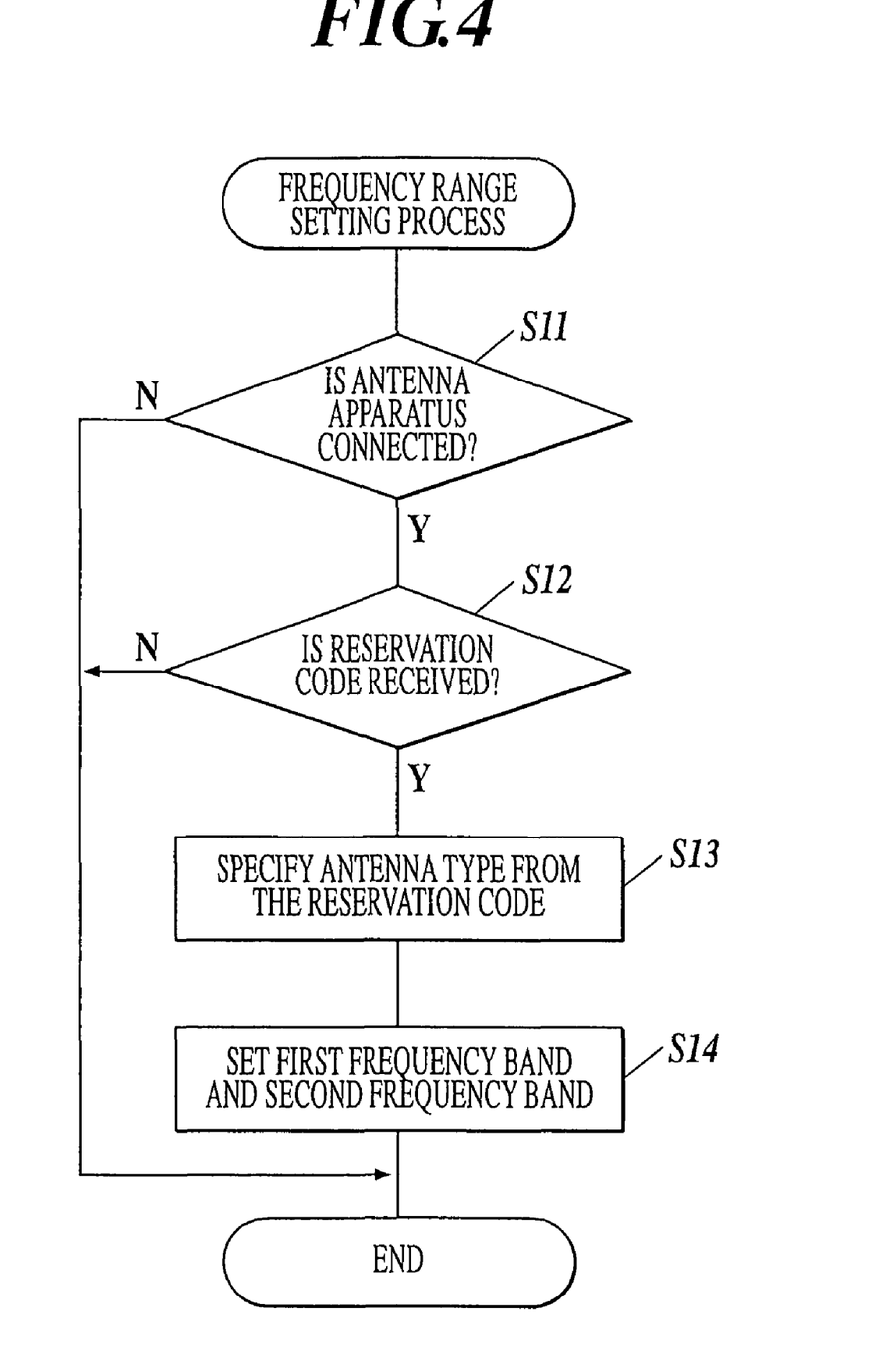
FIG. 4 is a flowchart showing a setting process of a frequency range (channel number) which can be received by a first antenna 13 and a second antenna 12 of an antenna apparatus 1.

FIG. 4 is a flowchart showing a setting process of frequency ranges (channel numbers) which can be received by the first antenna 13 and the second antenna 12 of the antenna apparatus 1.

First, in step S11, whether the antenna apparatus 1 is connected or not is determined. The process is finished as-is when the antenna apparatus 1 is not connected. On the other hand, when it is determined that the antenna apparatus 1 is connected in step S11, whether the reservation code as the identification information is received or not is determined in step S12.

When the reservation code is not received, the process is finished as-is. On the other hand, when it is determined in step S12 that the reservation code is received, the antenna type is specified from the reservation code in step S13. For example, by referring to the table shown in FIG. 3, it can be specified that the antenna apparatus has the manufacture's name of "a a a a" and the model number of "A A" in case where the reservation code which is transmitted from the antennal apparatus 1 is "a".

Next, the first frequency band to be received by the first antenna 13 and the second frequency band to be received by the second antenna are set in step S14. For example, 18 to 69 ch (to which the frequency band corresponds) is set as the first frequency band and 1 to 17 ch (to which the frequency band corresponds) is set as the second frequency band in case where the reservation code which is transmitted from the antenna apparatus 1 is "a".

As described above, according to the STB 3 of the embodiment, a user does not need to carry out complicated settings and the information relating to the antenna apparatus 1 which is needed for the channel auto scanning process in the STB 3 (for example, the first frequency band which can be received by the first antenna 13 and the second frequency band which can be received by the second antenna 12) can be set easily.

Figure 5A:
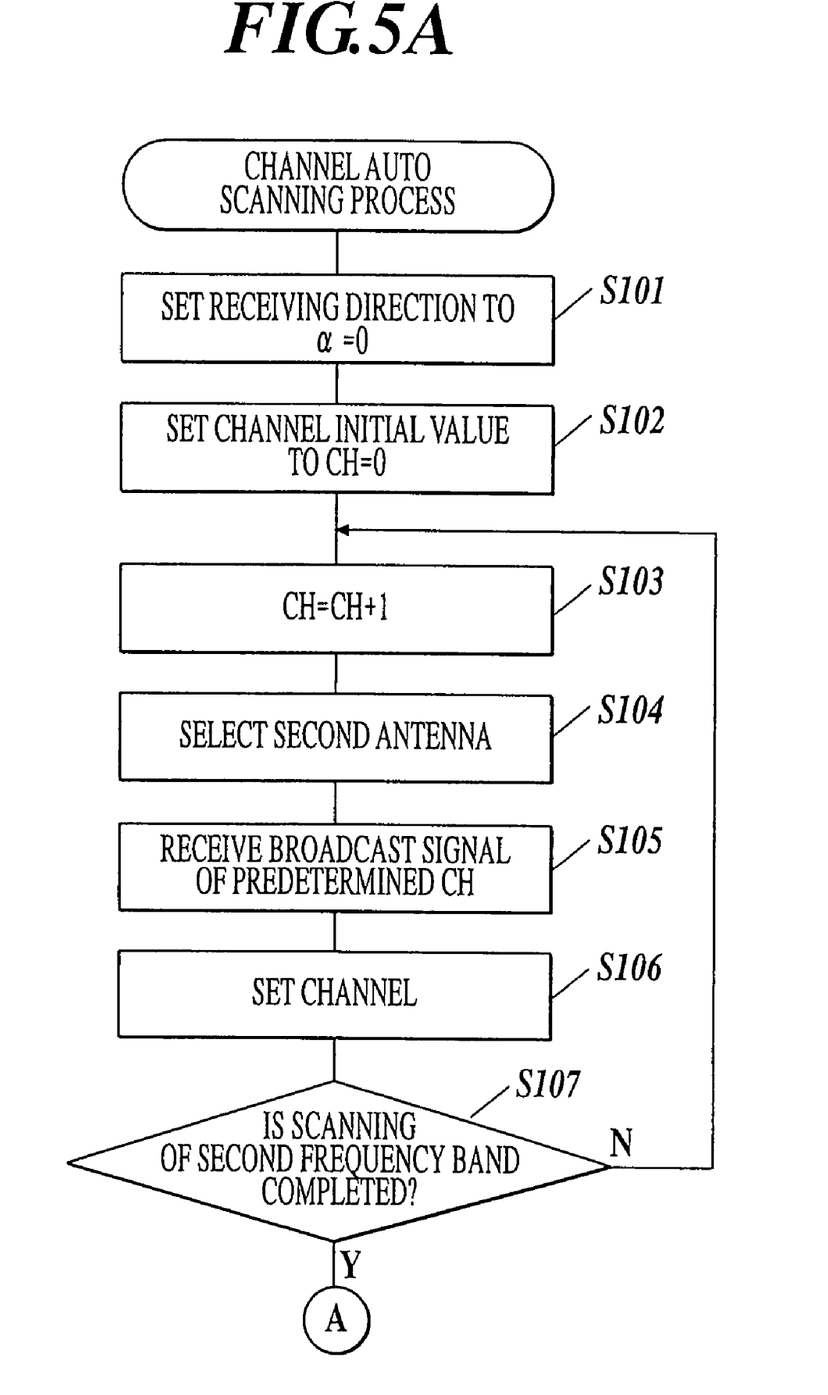
FIGS. 5A and 5B are flowcharts showing a channel auto scanning process in an STB3.
Figure 5B:
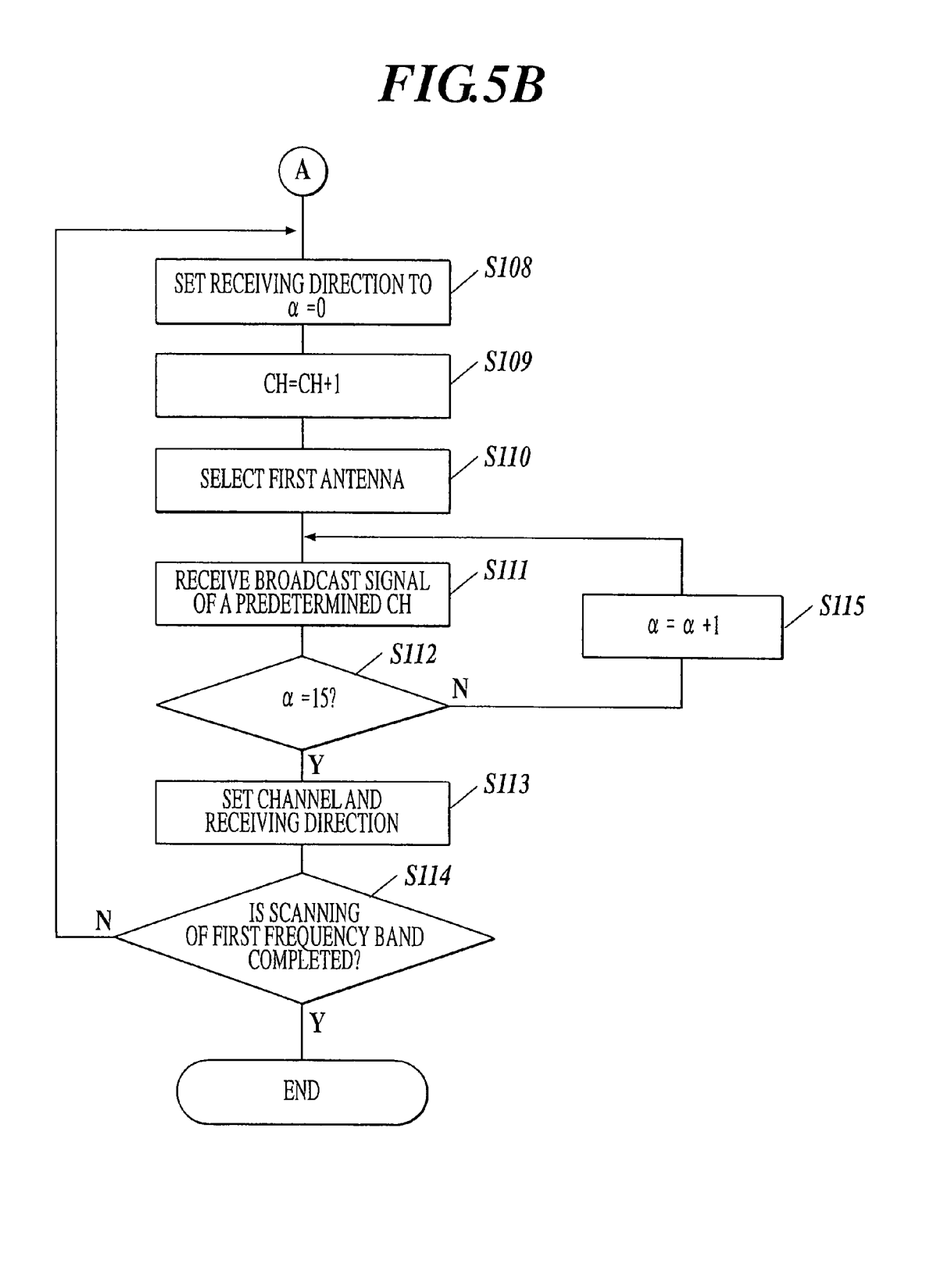

FIGS. 5A and 5B are flowcharts showing the channel auto scanning (channel auto setting) process in the STB 3. The channel auto scanning process, for example, is carried out by the control unit 38 executing a predetermined program based on an input operation from the remote control 361.

Here, explanation is given for cases where 18 to 69 ch (to which a frequency band corresponds) is set as the first frequency band and 1 to 17 ch (to which a frequency band corresponds) is set as the second frequency band in the frequency range setting process shown in the flowchart of FIG. 4.

First, when the channel auto scanning process is started, the receiving direction is initialized in step S101. For example, the receiving direction α is set to α=0. Here, with respect to a channel in the second frequency band (the VHF band), the receiving direction is set to α=0 for convenience sake although the receiving direction does not vary because the receiving direction is a single direction.

Subsequently, the channel is initialized in step S102. For example, the channel number CH is set to CH=0. In step S103, the value 1 is added to the channel number. That is, the channel number becomes CH=1. Next, in step S104, the second antenna (unidirectional antenna) 12 is selected as the receiving antenna (selection unit).

In step S105, the TV broadcast signal which corresponds to a predetermined channel is received. Then, in step S106, the channel is set as the receivable channel in case where the receiving level of larger or equal to a predetermined value is obtained concerning the TV broadcast signal of the channel (detection unit, channel setting unit).

By executing the above described processes, the channel setting of one TV broadcast signal in the second frequency band (the VHF band) is finished.

Next, concerning the channels (for example, 1 to 17 ch) which correspond to the TV broadcast signals in the second frequency band (the VHF band), whether all of the channel settings are completed or not, that is, whether the channel number becomes CH=17 or not is determined in step S107. Then, when it is determined that the channel number is not CH=17, the process proceeds to step S103 and the value 1 is added to the channel number, and the channel setting is carried out for the next channel.

On the other hand, when it is determined that the channel number is CH=17 in step S107, the channel auto scanning for the TV broadcast signal in the second frequency band is completed, and the process proceeds to step S108. Then, the channel auto scanning for the TV broadcast signal in the first frequency band (the UHF band) is started.

First, the receiving direction is initialized in step S108. For example, the receiving direction α is set to α=0. Here, with respect to the TV broadcast signal in the first frequency band, α has a value between 0 and 15 because the receiving direction varies in 16 directions.

Subsequently, in step S109, the value 1 is added to the channel number. That is, the channel number is CH=17 at the time when the channel auto scanning for the TV broadcast signal in the second frequency band is completed and the channel number becomes CH=18 when the value 1 is added. Then, in step S110, the first antenna (multiple directional antenna) is selected as the receiving antenna (selection unit).

In step S111, the TV broadcast signal which corresponds to a predetermined channel is received. Subsequently, in step S112, whether the receiving process is carried out for 16 directions or not, that is, whether the receiving direction becomes α=15 or not is determined. When it is determined that the receiving direction is not α=15 in step S112, the value 1 is added to α in step S115 and the processes following step S111 are carried out (receiving direction switching unit).

On the other hand, when it is determined that the receiving direction is α=15 in step S115, the process proceeds to step S113. Then, when the receiving level which is not less than a predetermined value is obtained concerning the TV broadcast signal of the channel in step S113, the channel is set as the receivable channel (detection unit, channel setting unit). At the same time, the receiving direction (α=0 to 15) in which the best receiving condition can be obtained is set based on the receiving levels for a plurality of receiving directions which are detected when the receiving directions are orderly changed (receiving direction setting unit).

By executing the above described processes, the channel setting of one TV broadcast signal in the first frequency band is finished.

Subsequently, in step S114, concerning channels (for example, 18 to 69 ch) which correspond to the TV broadcast signals in the first frequency band, whether all of the channel settings are completed or not, that is, whether the channel number becomes CH=69 or not is determined. Then, when it is determined that the channel is not CH=69, the process proceeds to step S108 and initializes the receiving direction. Further, the value 1 is added to the channel number in step S109, and the channel setting is carried out to the next channel.

On the other hand, when it is determined that the channel is CH=69 in step S114, the channel auto scanning for the channels in the first frequency band is completed, and the channel auto scanning process is finished.

As described above, in the embodiment, a channel and a receiving direction (α=0 to 15) of the broadcast signal is set for the TV broadcast signal in the first frequency band (18 to 69 ch) based on the receiving level of the received signal which is obtained when the first antenna (multi directional antenna) 13 is selected. On the other hand, only the channel of the broadcast signal is set for the TV broadcast signal in the second frequency band (1 to 17 ch) based on the receiving level of the received signal which is obtained when the second antenna (unidirectional antenna) 12 is selected. That is, with respect to the TV broadcast signal in the second frequency band which corresponds to the VHF band that is to be terminated in the future, the channel auto scanning is simplified by making the receiving direction be set in the single direction which is determined by the second antenna 12.

The number of broadcasting stations using TV broadcast signals in the VHF band is decreasing year by year and it is now only a few stations. Therefore, it is considered that the manual setting of the receiving direction can be sufficiently handled by a viewer.

As described above, according to the STB 3 of the embodiment, user's frustration of the execution of the channel auto scanning can be released because the time for the channel auto scanning for the TV broadcast signal in the second frequency band which corresponds to the VHF band can be remarkably reduced. Therefore, even the number of broadcasting stations increases or decreases along with digitalization of broadcasting, a user can execute the channel auto scanning relatively easily and a condition in which the desired broadcast signal can be received can be obtained.

The invention made by the present inventor is specifically explained based on the embodiment. However, the present invention is not limited to the above described embodiment, and may be modified within the scope of the invention.

In the above embodiment, descriptions are given for the frequency range setting process and the channel auto scanning process in case where the antenna apparatus 1 comprising the second antenna (unidirectional antenna) 12 and the first antenna (multiple directional antenna) 13 is used. However, construction of the antenna apparatus 1 is not limited to the above described construction. For example, the present invention may be applied in case where a so-called smart antenna is used as disclosed in the above mentioned Tokukai 2001-036327 (Tokkyo 3625155). That is, the present invention can be applied as long as the television broadcast signal receiving system comprises an antenna apparatus having two antenna elements, one for the first frequency band (the UHF band) and one for the second frequency band (the VHF band), and a television broadcast signal receiving apparatus.

However, when the antenna apparatus in which a multiple directional antenna is also used for the second frequency band (the VHF band) is used, the channel auto scanning process is different from the process shown in FIGS. 5A and 5B, and processes of step S108 through S114 of FIG. 5B are also carried out for channels in the second frequency band (the VHF band).

Moreover, in the above embodiment, the ranges of the first frequency band and the second frequency band are set by reading out the corresponding receive channel number information from the table (see FIG. 3) which is stored in the storage unit 37 based on the identification information of the antenna apparatus which is transmitted from the antenna apparatus 1. However, the receive channel number information which can be received by the antennas 12 and 13, respectively, may be transmitted from the antenna apparatus 1. In such case, there is no need for providing the table as shown in FIG. 3 which stores the antenna type and the received channel number information so as to correspond with each other in the television broadcast signal receiving apparatus.

Further, in the above embodiment, the first frequency band and the second frequency band are set in the STB 3 based on the information relating to the antenna apparatus which is transmitted from the antenna apparatus 1. However, the first frequency band and the second frequency band may be set by a viewer.

The entire disclosures of Japanese Patent Application No. 2006-103944 filed on Apr. 5, 2006 including specifications, claims, drawings and abstracts thereof are incorporated herein by reference in there entireties.

What is claimed is:

1. A television broadcast signal receiving system, comprising:
an antenna apparatus comprising a first antenna which can receive a broadcast signal in a first frequency band and a second antenna which can receive a broadcast signal in a second frequency band, and
a television broadcast signal receiving apparatus comprising a selection unit for selecting the first antenna or the second antenna according to a frequency of a broadcast signal which is to be received, a detecting unit for detecting a receiving level of a received signal which is received by the first antenna or the second antenna, a channel setting unit for setting a channel of the broadcast signal in which the receiving level detected by the detecting unit is not less than a predetermined value as a receivable channel, and a control unit for controlling each operation of the selection unit, the detecting unit, and the channel setting unit, wherein the antenna apparatus comprises a transmission unit which can transmit identification information of the antenna apparatus as information relating to the antenna apparatus to the television broadcast signal receiving apparatus, wherein the information relating to the antenna apparatus is automatically transmitted when the antenna apparatus is connected to the television broadcast signal receiving apparatus, and wherein the television broadcast signal receiving apparatus comprises a storage unit in which the identification information by which the antenna apparatus can be identified and receive channel number information which corresponds to the identification information are stored, a receiving unit which can receive the information relating to the antenna apparatus which is transmitted from the antenna apparatus, and a frequency range setting unit which can set ranges of the first frequency band which is to be received by the first antenna and the second frequency band which is to be received by the second antenna by reading out the corresponding receive channel number information from the storage unit based on the identification information of the antenna apparatus which is transmitted from the antenna apparatus.

2. A television broadcast signal receiving system, comprising:

an antenna apparatus comprising a first antenna which can receive a broadcast signal in a first frequency band and a second antenna which can receive a broadcast signal in a second frequency band, and a television broadcast signal receiving apparatus comprising a selection unit for selecting the first antenna or the second antenna according to a frequency of a broadcast signal which is to be received, a detecting unit for detecting a receiving level of a received signal which is received by the first antenna or the second antenna, a channel setting unit for setting a channel of the broadcast signal in which the receiving level detected by the detecting unit is not less than a predetermined value as a receivable channel, and a control unit for controlling each operation of the selection unit, the detecting unit, and the channel setting unit, wherein the antenna apparatus comprises a transmission unit which can transmit identification information of the antenna apparatus to the television broadcast signal receiving apparatus and the antenna apparatus automatically transmits information relating to the antenna apparatus to the television broadcast signal receiving apparatus when the antenna apparatus is connected to the television broadcast signal receiving apparatus, the television broadcast signal receiving apparatus comprises a receiving unit which can receive information relating to the antenna apparatus which is transmitted from the antenna apparatus and a frequency range setting unit which can set ranges of the first frequency band which is to be received by the first antenna and the second frequency band which is to be received by the second antenna based on the information relating to the antenna apparatus which is received by the receiving unit, and the control unit controls the selection unit based on the first frequency band and the second frequency band which are set by the frequency range setting unit.

3. The television broadcast signal receiving system as claimed in claim 2, wherein the identification information of the antenna apparatus is included in the information relating to the antenna apparatus, the television broadcast signal receiving apparatus comprises a storage unit in which the identification information by which the antenna apparatus can be identified and receive channel number information corresponding to the identification information are stored, and the frequency range setting unit sets the ranges of the first frequency band which is to be received by the first antenna and the second frequency band which is to be received by the second antenna by reading out the corresponding receive channel number information from the storage unit based on the identification information of the antenna apparatus which is transmitted from the antenna apparatus.

4. The television broadcast signal receiving system as claimed in claim 2, wherein receive channel number information is included in the information relating to the antenna apparatus, and the frequency range setting unit sets the ranges of the first frequency band which is to be received by the first antenna and the second frequency band which is to be received by the second antenna based on the receive channel number information which is transmitted from the antenna apparatus.

5. The television broadcast signal receiving system as claimed in claim 2, wherein the receiving unit starts a process of obtaining the information relating to the antenna apparatus when the television broadcast signal receiving apparatus is connected to the antenna apparatus.

6. The television broadcast signal receiving system as claimed in claim 3, wherein the receiving unit starts a process of obtaining the information relating to the antenna apparatus when the television broadcast signal receiving apparatus is connected to the antenna apparatus.

7. The television broadcast signal receiving system as claimed in claim 4, wherein the receiving unit starts a process of obtaining the information relating to the antenna apparatus when the television broadcast signal receiving apparatus is connected to the antenna apparatus.

8. A television broadcast signal receiving apparatus which is connected to an antenna apparatus having a first antenna which can receive a broadcast signal in a first frequency band and a second antenna which can receive a broadcast signal in a second frequency band, comprising:

a selection unit for selecting the first antenna or the second antenna according to a frequency of a broadcast signal which is to be received, a detecting unit for detecting a receiving level of a received signal which is received by the first antenna or the second antenna, a channel setting unit for setting a channel of the broadcast signal in which the receiving level detected by the detecting unit is not less than a predetermined value as a receivable channel, a control unit for controlling each operation of the selection unit, the detecting unit, and the channel setting unit, a receiving unit which can receive information relating to the antenna apparatus which is automatically transmitted from the antenna apparatus when the television broadcast signal receiving apparatus is connected with the antenna apparatus, and a frequency range setting unit which can set ranges of the first frequency band which is to be received by the first antenna and the second frequency band which is to be received by the second antenna based on the information relating to the antenna apparatus which is received by the receiving unit, wherein the control unit controls the selection unit based on the first frequency band and the second frequency band which are set by the frequency range setting unit.

9. The television broadcast signal receiving apparatus as claimed in claim 8, wherein identification information of the antenna apparatus is included in the information relating to the antenna apparatus, the television broadcast signal receiving apparatus comprises a storage unit in which the identification information by which the antenna apparatus can be identified and receive channel number information corresponding to the identification information are stored, and the frequency range setting unit sets the ranges of the first frequency band which is received by the first antenna and the second frequency band which is received by the second antenna by reading out the corresponding receive channel number information from the storage unit based on the identification information of the antenna apparatus which is transmitted from the antenna apparatus.

10. The television broadcast signal receiving apparatus as claimed in claim 8, wherein receive channel number information is included in the information relating to the antenna apparatus, and the frequency range setting unit sets the ranges of the first frequency band which is received by the first antenna and the second frequency band which is received by the second antenna based on the receive channel number information which is transmitted from the antenna apparatus.

11. The television broadcast signal receiving apparatus as claimed in claim 8, wherein the receiving unit starts a process of obtaining the information relating to the antenna apparatus when the television broadcast signal receiving apparatus is connected to the antenna apparatus.

12. The television broadcast signal receiving apparatus as claimed in claim 9, wherein the receiving unit starts a process of obtaining the information relating to the antenna apparatus when the television broadcast signal receiving apparatus is connected to the antenna apparatus.

13. The television broadcast signal receiving apparatus as claimed in claim 10, wherein the receiving unit starts a process of obtaining the information relating to the antenna apparatus when the television broadcast signal receiving apparatus is connected to the antenna apparatus.

14. An antenna apparatus connected to a television broadcast signal receiving apparatus, comprising:

a multiple directional antenna which can receive a broadcast signal in a first frequency band from multiple directions, an unidirectional antenna which can receive a broadcast signal in a second frequency band from one direction, a first switching unit which can control a selection of an antenna which receives the broadcast signal by the television broadcast signal receiving apparatus, a second switching unit which can control a switching of a receiving direction of the multiple directional antenna, and a transmitting unit which can automatically transmit information relating to the antenna apparatus to the television broadcast signal receiving apparatus when the antenna apparatus is connected to the television broadcast signal receiving apparatus.

15. The antenna apparatus as claimed in claim 14, wherein the transmitting unit automatically transmits the information relating to the antenna apparatus when the antenna apparatus is connected to the television broadcast signal receiving apparatus.

* * * * *